(12) United States Patent
Umemoto et al.

(10) Patent No.: US 6,616,289 B2
(45) Date of Patent: Sep. 9, 2003

(54) LIGHT PIPE, PLANE LIGHT SOURCE UNIT AND LIQUID-CRYSTAL DISPLAY DEVICE

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/734,691

(22) Filed: Dec. 13, 2000

(65) Prior Publication Data
US 2001/0009508 A1 Jul. 26, 2001

(30) Foreign Application Priority Data
Dec. 13, 1999 (JP) .............................. 11-353139

(51) Int. Cl.[7] .................................................. F21V 7/04
(52) U.S. Cl. ............................. 362/31; 362/561; 362/26
(58) Field of Search ............................. 362/31, 561, 26

(56) References Cited

U.S. PATENT DOCUMENTS

| | | | |
|---|---|---|---|
| 5,727,107 A | | 3/1998 | Umemoto et al. ........... 385/116 |
| 5,921,651 A | * | 7/1999 | Ishikawa ..................... 362/31 |
| 5,921,652 A | | 7/1999 | Parker et al. ................ 362/31 |
| 6,108,060 A | * | 8/2000 | Funamoto et al. ........... 362/31 |
| 6,199,995 B1 | * | 3/2001 | Umemoto ..................... 362/31 |
| 6,224,223 B1 | * | 5/2001 | Higuchi et al. .............. 362/31 |

FOREIGN PATENT DOCUMENTS

| | | | |
|---|---|---|---|
| DE | 198 51 432 A1 | 5/2000 | ........... G09F/13/18 |
| WO | 00/11507 | 3/2000 | ........... G02B/6/00 |

* cited by examiner

Primary Examiner—Sandra O'Shea
Assistant Examiner—Guiyoung Lee
(74) Attorney, Agent, or Firm—Sughrue Mion, PLLC

(57) ABSTRACT

A light pipe includes rectangular upper and lower surfaces, an incidence side surface which is one of side surfaces between the upper and lower surfaces, and light output means formed in one of the upper and lower surfaces so that light incident on the incidence side surface exits from the other one of the upper and lower surfaces through the light output means. A radius of curvature of a corner portion formed at a point of intersection between the incidence side surface and each of side surfaces adjacent to the incidence side surface is not larger than 0.3 mm. A plane light source unit in which a linear light source is disposed on the incidence side surface of the light pipe is provided. A transmission type or reflection type, or reflection-transmission double type liquid-crystal display device which has at least such a plane light source unit and a liquid-crystal cell is provided.

18 Claims, 2 Drawing Sheets

LIGHT PIPE, PLANE LIGHT SOURCE UNIT AND LIQUID-CRYSTAL DISPLAY DEVICE

BACKGROUND OF THE INVENTION

1. Field of the Invention

The present invention relates to a light pipe and a plane light source unit, which are excellent in light utilizing efficiency and uniformity of brightness, and which can constitute a liquid-crystal display device bright and easy to view.

The present application is based on Japanese Patent Application No. Hei. 11-353139, which is incorporated herein by reference.

2. Description of the Related Art

Heretofore there were known a transmission type liquid-crystal display device and a reflection type liquid-crystal display device. A plane light source unit was constituted by a light pipe having a light output means constituted by prismatic structures, and a light source disposed on a side of the light pipe. Such a plane light source unit was used as a back-lighting system unit for a transmission type liquid-crystal cell in the transmission type liquid-crystal display device. On the other hand, the plane light source unit was used as a front-lighting system unit for a reflection type liquid-crystal cell in the reflection type liquid-crystal display device. There was, however, a problem that a dark portion was produced in light emission of the light pipe to thereby cause lowering of display quality.

SUMMARY OF THE INVENTION

It is an object of the present invention to develop a light pipe by which it is possible to form a light emission condition which is excellent in uniformity of brightness because when the light pipe is used to form a plane light source unit, partial dark portions as shades are hardly produced. By such a light pipe, it is possible to form a liquid-crystal display device which is bright and easy to view.

According to the present invention, there is provided a light pipe comprising a plate-like member at least including rectangular upper and lower surfaces, and an incidence side surface which is one of side surfaces between the upper and lower surfaces, and a light output means formed in one of the upper and lower surfaces so that light incident on the incidence side surface exits from the other one of the upper and lower surfaces through the light output means, wherein a radius of curvature of a corner portion formed at a point of intersection between the incidence side surface and each of side surfaces adjacent to the incidence side surface is not larger than 0.3 mm. There is further provided a plane light source unit in which a linear light source is disposed on the incidence side surface of the light pipe. There is further provided a transmission type or reflection type or reflection-transmission double type liquid-crystal display device which comprises at least such a plane light source unit and a liquid-crystal cell.

According to the present invention, in the case where a plane light source unit is used, partial dark portions as shades, especially dark portions as shades because of corner portions at ends of an incidence side surface are hardly produced so that a light emission state excellent in uniformity of brightness can be formed. Hence, there can be obtained a light pipe which is excellent in light utilizing efficiency and which can constitute a liquid-crystal display device bright and easy to view.

That is, the inventors of the present invention have eagerly made investigations in order to prevent such dark portions from being produced in the plane light source unit which uses a light pipe having a light output means constituted by slopes such as prismatic structures, etc. In the meanwhile, the inventors have found that the fine shape of the corner portions at ends of the incidence side surface of the light pipe has a strong influence on the production of stripe-like shades in a direction of light transmission at the ends of the incidence side surface. They also have found that the more the corner portions are rounded, the more the quantity of incidence of light or the quantity of backward transmission of light due to reflection or refraction decreases or the more the width of strip-like shades increases. The findings are conceived to be based on the characteristic of the light pipe as follows. In the light pipe having the light output means, incident light is transmitted through the light pipe while prevented as much as possible from being scattered. The transmitted light is made to exit from one of the upper and lower surfaces through reflection, especially through total reflection by the light output means. Hence, if variation in light incident on the incidence side surface occurs, the variation will cause difference between brightness and darkness in output light.

Incidentally, in a light pipe having a scatter type light output means constituted by dot-like unevenness, embossed unevenness, or the like, the aforementioned shade problem hardly occurs even in the case where the roundness of corner portions at ends of the incidence side surface is relatively large. In this case, however, if output light exits at a large angle of about 60 degrees, dark light emission occurs in the frontal (perpendicular) direction, so that frontal luminance runs short. Hence, it is difficult to achieve high-luminance transmission type display when the light pipe is applied to a back-lighting system. Furthermore, it is difficult to put the light pipe in practical use because display light is scattered and can not be viewed when the light pipe is applied to a front-lighting system.

Hence, the aforementioned shade problem is peculiar to a light pipe having a light output means constituted by slopes such as prismatic structures. On the other hand, the light pipe, however, exhibits the aforementioned characteristic. Hence, the light pipe is excellent in directivity of light reflected by the slopes, so that frontal light favorable to viewing in a transmission mode can be formed efficiently. Hence, bright display with high luminance can be obtained. Furthermore, even in the case where the light pipe is applied to a front-lighting system, display light can be efficiently transmitted in the frontal direction so that display bright and easy to view can be obtained.

Features and advantages of the invention will be evident from the following detailed description of the preferred embodiments described in conjunction with the attached drawings.

DETAILED DESCRIPTION OF THE PREFERRED EMBODIMENTS

Figure 1:
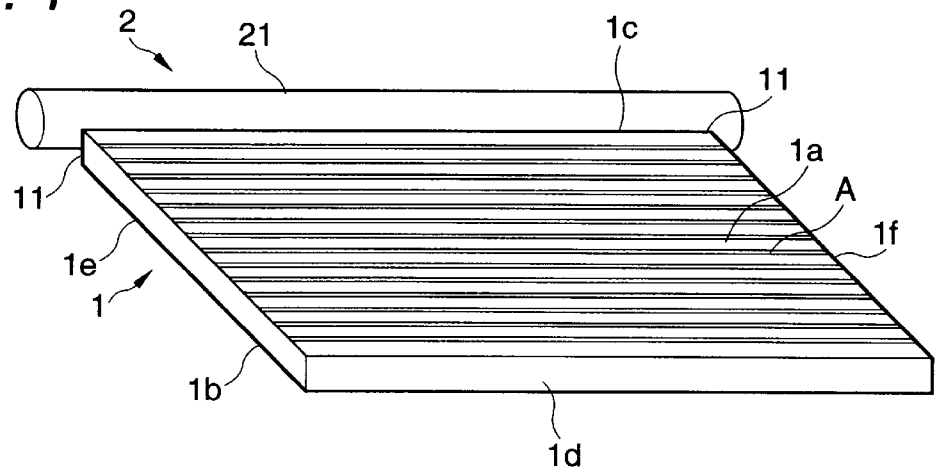
FIG. 1 is a perspective view for explaining an example of a plane light source unit (light pipe)
Figure 2:
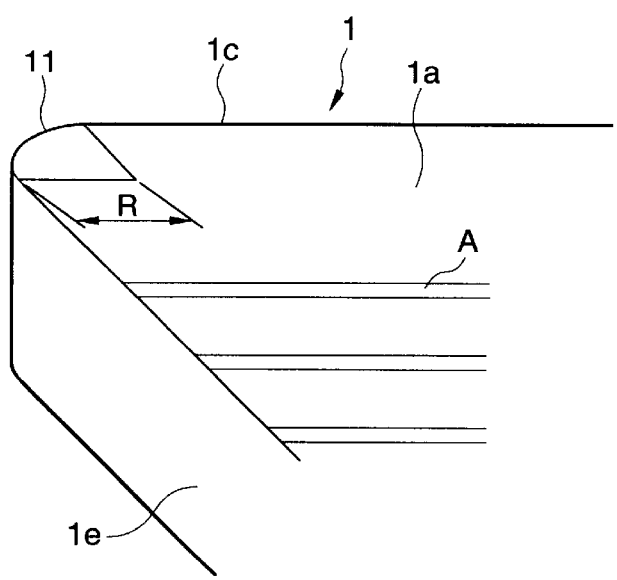
FIG. 2 is a perspective view for explaining a corner portion in an incidence side surface of the light pipe.

According to the present invention, there is provided a light pipe comprising a plate-like member at least including rectangular upper and lower surfaces, and an incidence side surface which is one of side surfaces between the upper and lower surfaces, and a light output means formed in one of the upper and lower surfaces so that light incident on the incidence side surface exits from the other one of the upper and lower surfaces through the light output means, wherein a radius of curvature of a corner portion formed at a point of intersection between the incidence side surface and each of side surfaces adjacent to the incidence side surface is not larger than 0.3 mm. FIGS. 1 and 2 show an example of the light pipe. In FIGS. 1 and 2, a light pipe 1 has an upper surface 1a, a lower surface 1b, and an incidence side surface 1c. Incidentally, FIG. 1 shows the case where a plane light source unit 2 is formed. In FIG. 1, the reference numeral 21 designates a linear light source.

More specifically, as shown in FIG. 1, the light pipe is made of a plate-like member at least having a rectangular upper surface 1a, a rectangular lower surface 1b opposite to the upper surface, and an incidence side surface 1c which is one of side surfaces between the upper and lower surfaces. A light output means A is formed in one of the upper and lower surfaces so that light incident on the incidence side surface exits from the other of the upper and lower surfaces through the light output means A. The light pipe may be of an uniform thickness type as shown in FIG. 1 or may be of a type in which a counter side surface 1d opposite to the incidence side surface 1c is thinner than the incidence side surface 1c. The reduction in thickness of the counter side surface is favorable to reduction in weight, improvement in efficiency of incidence of light on the incidence side surface to the light output means, and so on. Incidentally, FIG. 1 shows the case where the light output means A is formed in the upper surface 1a.

As shown in FIG. 2, the light pipe 1 is formed to be rounded at corner portions so that the radius R of curvature of each corner portion 11 formed at a point of intersection between the incidence side surface 1c and a side surface 1e adjacent to the incidence side surface 1c is as small as possible, for example, not larger than 0.3 mm. Hence, stripe-like shade can be prevented from being produced in a direction of light transmission at ends of the incidence side surface. From the point of view of preventing the production of shade, the radius R of curvature is preferably not larger than 0.2 mm, more preferably not larger than 0.1 mm. Although FIG. 2 shows the corner portion formed at one point of intersection between the incidence side surface 1c and the side surface 1e, it is preferable that a corner portion formed at the other point of intersection between the incidence side surface 1c and a side surface 1f adjacent to the incidence side surface 1c is also rounded with the same radius of curvature.

Figure 3:
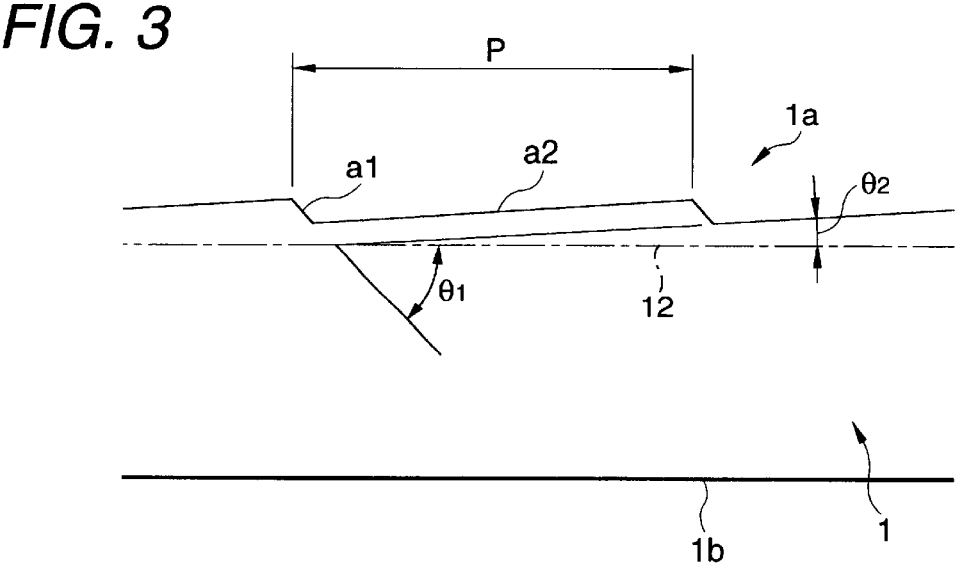
FIG. 3 is a side view for explaining a light output means in the light pipe.

The light output means formed in one of the upper and lower surfaces of the light pipe can be made of a suitable material exhibiting the aforementioned light output characteristic. From the point of view of obtaining illumination light excellent in frontal directivity, preferably, a light output means has slopes facing the incidence side surface, more preferably, a light output means is constituted by repetitive prismatic structures. Although the prismatic structures may be made of convex or concave portions each having equal-side surfaces, it is preferable from the point of view of light utilizing efficiency, etc. that the prismatic structures are made of convex or concave portions each having a combination of a short side surface and a long side surface. FIG. 3 shows an example of the prismatic structures. In FIG. 3, the reference numeral a1 designates a short side surface; and a2, a long side surface.

From the point of view of achievement of the aforementioned characteristic such as frontal directivity, it is preferable that the light output means at least has a repetitive structure of slopes each inclined at an inclination angle in a range of from 35 to 45 degrees with respect to a reference plane of one of the upper and lower surfaces in which no light output means is provided, and each facing the incidence side surface. More preferably, the light output means is constituted by a repetitive structure of prismatic structures each having a combination of a short side surface a1 ($\theta_1$) and a long side surface a2 ($\theta_2$), as shown in FIG. 3. The short side surface a1 ($\theta_1$) is inclined down from the incidence side surface 1c side to the counter side surface 1d side at an inclination angle in a range of from 35 to 45 degrees with respect to the reference plane 12, and the long side surface a2 ($\theta_2$) is inclined at an inclination angle in a range of from 0 (exclusively) to 10 degrees with respect to the reference plane 12.

In the above description, the short side surfaces a1 formed as slopes inclined down from the incidence side surface side to the counter side surface side have a role of reflecting light given to the short side surfaces among all light incident on the incidence side surface to thereby supply the reflected light to the counter surface (light exit surface). In this case, by setting the inclination angle $\theta_1$ of each of the short side surfaces to be in a range of from 35 to 45 degrees, transmission light can be reflected with good perpendicularity with respect to the light exit surface so that output light (illumination light) excellent in frontal directivity can be obtained efficiently. From the point of view of frontal directivity, etc., and in consideration of the total reflection condition for light transmitted inside the light pipe on the basis of refraction in accordance with Snell's law, the inclination angle $\theta_1$ of each of the slopes or short side surfaces is preferably in a range of from 38 to 44 degrees, more preferably in a range of from 40 to 43 degrees. Incidentally, when an optical path control layer such as a prism sheet is provided on the light pipe, the inclination angle $\theta$ of each of the short side surfaces is preferably selected to be in a range of from 35 to 40 degrees because slight displacement of the output angle from the frontal direction is advantageous.

Figure 4:
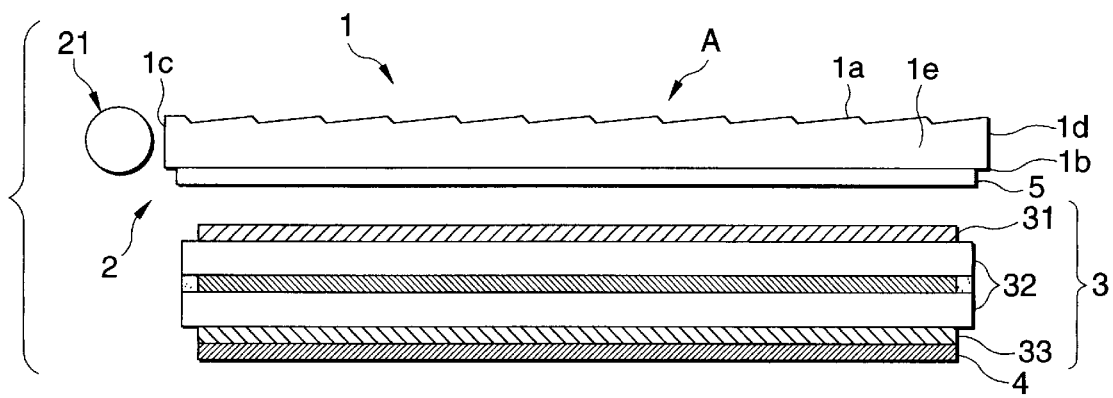
FIG. 4 is a sectional view for explaining an example of a reflection type liquid-crystal display device.
Figure 5:
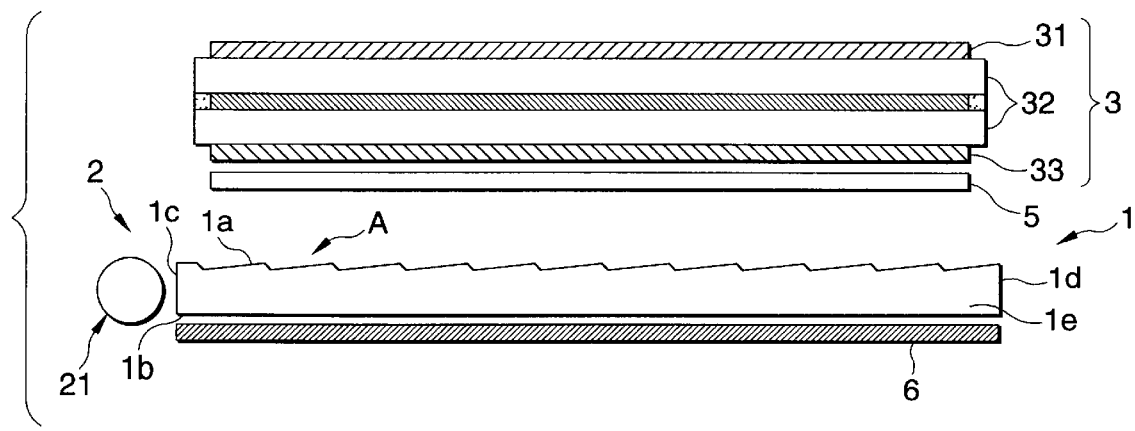
FIG. 5 is a sectional view for explaining an example of a transmission type (reflection-transmission double type) liquid-crystal display device.

On the other hand, the long side surfaces a2 are provided for the purposes of: receiving external light so that the external light is reflected by the reflection layer 4 and transmitted through the long side surfaces in a reflection type liquid-crystal display device using a front-lighting system as shown in FIG. 4; and turning over output light reflected from the short side surfaces by the reflection layer 4 or 6 so that the light is transmitted through the long side surfaces in a transmission type liquid-crystal display device using a back-lighting system as shown in FIGS. 4 and 5. From this point of view, it is preferable that the inclination angle $\theta_2$ of the long side surfaces with respect to the reference plane 12 is not larger than 10 degrees. If the inclination angle $\theta_2$ is larger than 10 degrees, the optical path change due to refraction becomes so large that the quantity of light in the frontal direction is reduced unfavorably for display.

Although the inclination angle $\theta_2$ of the long side surfaces may be 0 degree (horizontal), if the angle is set to be larger than 0 degree, transmission light can be collimated when the transmission light incident on the long side surfaces is reflected to be supplied to the short side surfaces. In this case, directivity of light reflected by the short side surfaces can be enhanced to be favorable for display. From the point of view of the aforementioned performance such as increase of the quantity of light in the frontal direction, collimation of transmission light, etc., the inclination angle $\theta_2$ of the long side surfaces is preferably not larger than 8 degrees, more preferably not larger than 5 degrees.

From the point of view of the aforementioned function, the angle difference in inclination angle $\theta_2$ between the long side surfaces is set, preferably, to be not larger than 5 degrees, more preferably not larger than 4 degrees, further preferably not larger than 3 degrees on the whole of the light pipe, and the difference in inclination angle $\theta_2$ between adjacent ones of the long side surfaces is set, preferably, to be not larger than 1 degree, more preferably not larger than 0.3 degrees, further preferably not larger than 0.1 degrees. The angle difference in inclination angle $\theta_2$ is determined on the assumption that the inclination angle of the long side surfaces is not larger than 10 degrees as described above. That is, the angle difference is determined on the assumption that deflection of the display image due to refraction of light transmitted through the long side surfaces is suppressed to set the small inclination angle $\theta_2$ to be in an allowable range. This purpose is that the optimum viewing direction of the liquid-crystal display device optimized by setting a point of observation in a direction near the perpendicular direction is prevented from being changed.

From the point of view of obtaining a bright display image, it is preferable that a light pipe is excellent in efficiency of incidence of external light and excellent in efficiency of transmission of the display image through the liquid-crystal cell or efficiency of output of the display image from the liquid-crystal cell. From this point of view, the light pipe is provided as a light pipe having prismatic structures in which the projected area of the long side surfaces on the reference plane is, preferably, not smaller than 8 times, more preferably not smaller than 10 times, further preferably not smaller than 15 times as large as that of the short side surfaces. Hence, a great part of the display image generated by the liquid-crystal cell can be transmitted through the long side surfaces. Incidentally, in transmission of the display image generated by the liquid-crystal cell, the display image incident on the short side surfaces is reflected toward the incident side surface side so as not to be outputted from the surface having the light output means, or is deflected so as to be outputted in a direction largely different from and opposite to the direction of the display image transmitted through the long side surfaces with a normal line with respect to the light exit surface as a reference. Hence, the display image incident on the short side surfaces has little influence on the display image transmitted through the long side surfaces.

Hence, from the aforementioned point of view, it is preferable that the short side surfaces are not localized with respect to pixels of the liquid-crystal cell. To put it in an extreme way, if the short side surfaces overlap all the pixels, the display image can be hardly viewed in proximity to the perpendicular direction thereof through the long side surfaces. Hence, from the point of view of prevention of unnatural display due to shortage of transmission of display light, etc., the area where the pixels overlap the short side surfaces is preferably reduced to thereby keep the light transmittance of the long side surfaces sufficient.

In consideration that the pixel pitch of the liquid-crystal cell is generally in a range of from 100 to 300 $\mu$m, and from the aforementioned point of view and from a point of view of easiness of formation of prismatic structures, etc., each of the slopes or short side surfaces is formed, preferably, to be not larger than 40 $\mu$m, more preferably in a range of from 3 to 20 $\mu$m, further preferably in a range of from 5 to 15 $\mu$m in terms of the projected width of the slope or short side surface on the reference plane. Incidentally, as the projected width of the slope or short side surface decreases, a higher-grade technique is required for forming the short side surface or the like. If the vertices of the prismatic structures are rounded with a curvature of radius not smaller than a predetermined value, a scattering effect may appear to cause disorder of the display image, etc. Further, because the coherence length of a fluorescent tube is generally set to be about 20 $\mu$m, reduction of the projected width of the short side surface easily causes diffraction etc. and, therefore, lowering of display quality.

It is preferable from the aforementioned point of view that the distance between adjacent ones of the slopes or short side surfaces is large. As described above, however, the short side surfaces serve as a functional portion for substantially outputting light incident on the side surface. Hence, if the distance is too large, illumination at the time of switching-on becomes so sparse that display may be unnatural. In consideration of these facts, the repetition pitch P of the prismatic structures as shown in FIG. 3 is preferably set to be in a range of from 50 $\mu$m to 1.5 mm. Incidentally, the pitch maybe irregular, for example, as represented by a random pitch, a random or regular combination of a predetermined number of pitch units, or the like. Generally, the pitch may be preferably constant.

When the light output means is constituted by slopes or prismatic structures, moire may occur because of interference between the light output means and the pixels of the liquid-crystal cell. Although prevention of moire can be made by the adjustment of the pitch of the slopes or prismatic structures, the pitch of the prismatic structures or the like is limited to the aforementioned preferable range. Hence, measures against the case where moire occurs though the pitch is in the aforementioned range are a subject of discussion. In the present invention, a method, in which the slopes or prismatic structures are formed to be inclined with respect to the reference plane of the incidence side surface so that the prismatic structures can be arranged to cross the pixels, is preferably used for prevention of moire. On this occasion, if the inclination angle is too large, deflection occurs in reflection by the slopes or short side surfaces. As a result, large deviation occurs in the direction of output light. Hence, anisotropy in the intensity of light emission in the light-transmitting direction of the light pipe becomes large, so that light utilizing efficiency is reduced. This reduction is apt to cause lowering of display quality.

From the aforementioned point of view, the inclination angle of the direction of arrangement of the slopes or prismatic structures, that is, the inclination angle of the direction of the ridgelines of the slopes or prismatic structures with respect to the reference plane of the incidence side surface is preferably set to be in a range of ±30 degrees, more preferably in a range of ±28 degrees, further preferably in a range of ±25 degrees. Incidentally, the symbol "±" means the direction of inclination with the incidence side surface as a reference. If the resolution of the liquid-crystal cell is so low that no moire occurs or moire is negligible, it is preferable that the slopes or prismatic structures are arranged to be as parallel with the incidence side surface as possible.

The light pipe can be formed into a suitable shape as described above. Also in the case where the light pipe is shaped like a wedge, etc., the shape can be determined suitably. For example, a suitable surface shape such as a linear surface or a curved surface can be used as each of the upper and lower surfaces of the light pipe. Further, the slopes or prismatic structures constituting the light output means may be formed into a suitable surface shape such as a linear surface, a folded surface, a curved surface, etc. Further, the prismatic structures may be constituted by a combination of prismatic structures different in shape, etc. as well as the pitch. In addition, the slopes or prismatic structures may be formed as a series of convex or concave portions having ridgelines continuously connected to one another or may be formed as intermittent convex or concave portions discontinuously arranged at intervals of a predetermined distance in the direction of the ridgeline.

The shape of the light exit surface or incidence side surface in the light pipe is not particularly limited and may be determined suitably. Generally, a flat surface is formed as the light exit surface and a surface perpendicular to the light exit surface is formed as the incidence side surface. For example, a shape such as a concavely curved shape, etc., corresponding to the outer circumference of the light source may be used as the shape of the incidence side surface so that efficiency of incidence of light can be enhanced. Further, the incidence side surface may be constituted by an incidence side surface structure having an introduction portion interposed between the light source and the light pipe. In this case, the introduction portion can be formed into a suitable shape corresponding to the light source, or the like.

The light pipe can be made of a suitable material which exhibits transparency in accordance with the wavelength range of the light source. Incidentally, examples of the material to be used in a visible light range include transparent resins represented by acrylic resin, polycarbonate resin, epoxy resin or norbornene resin; glass; etc. A light pipe made of a material exhibiting no birefringence or small birefringence may be used preferably. Although a light pipe made of a high-refractive-index material is used preferably from the point of view of the output angle and efficiency due to total reflection, the transmission angle of incident light, etc., a light pipe made of a material having a refractive index of, preferably, not larger than 1.55, more preferably not larger than 1.53, further preferably not larger than 1.51 is used in a front-lighting system. This is because, if the refractive index of the light pipe is too high, increase of surface reflection causes lowering of contrast.

The light pipe can be formed by a suitable method such as a cutting method. Examples of the production method preferable from the point of view of mass production, etc., include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or by a solvent; a method in which a fluid resin polymerizable by heat, ultraviolet rays, radial rays, etc., is polymerized in the condition that the fluid resin is cast in a mold capable of forming a predetermined shape or in a condition that a mold capable of forming a predetermined shape is filled with the fluid resin; and so on. Incidentally, the light pipe need not be formed as a monolithic single-layer plate made of one kind of material, but may be formed as a laminate of parts made of one kind of material or different kinds of materials. For example, the light pipe may be provided as a plate in which a sheet having a light output means such as prismatic structures, etc., adheres to a light guide portion for performing transmission of light.

The thickness of the light pipe can be determined suitably in accordance with the size of the light pipe, the size of the light source, etc. in accordance with the purpose of use. Generally, the thickness of the light pipe to be used for forming a liquid-crystal display device, or the like, is not larger than 10 mm, particularly in a range of from 0.1 to 5 mm, more particularly in a range of from 0.3 to 5 mm in terms of the thickness of the incidence side surface. From the point of view of achievement of bright display, etc., the light pipe has the total light transmittance of perpendicularly incident light from the light exit surface to the light output means-forming surface, preferably, not lower than 90%, more preferably not lower than 92%, further preferably not lower than 95%, and has haze, preferably, not higher than 30%, more preferably not higher than 15%, further preferably not lower than 10%.

In the light pipe according to the present invention, incident light on the light output means-forming surface and light exit surfaces is transmitted well to exit from the light exit surface or light output means-forming surface. Hence, collimated light can be outputted with high accuracy in a direction excellent in perpendicularity favorable to visual recognition by use of the light pipe. Hence, the light pipe can be used to form various devices such as a plane light source which can utilize light from a linear light source efficiently; a reflection-transmission double type liquid-crystal display device which is bright, easy to view and excellent in power saving; or the like.

Incidentally, the plane light source unit can be formed by arrangement of a linear light source 21 on the incidence side surface 1c of the light pipe 1 as shown in FIG. 1. A suitable material can be used as the linear light source. For example, a linear light source such as a (cold or hot) cathode tube, an array of point light sources such as light-emitting diodes arranged linearly, a linear light source using a device such as a linear light pipe for converting light of a point light source into a state of linear light emission, or the like, may be preferably used as the linear light source. From the point of view of preventing the production of shade, etc., it is preferable that the linear light source to be used has an effective light emission length not smaller than the longitudinal length of the incidence side surface.

The plane light source unit may be formed as a combination in which suitable assisting means such as a light source holder, etc., for enclosing the linear light source to lead light scattered from the linear light source 21 to the incidence side surface 1c of the light pipe 1 are arranged as occasion demands. A resin sheet coated with a high-reflectance metal thin film, a sheet of metal foil, or the like, is generally used as the light source holder. If the light source holder is stuck to an end portion of the light pipe through an adhesive agent, or the like, the formation of the light output means in the adhesive portion can be omitted.

On the other hand, the liquid-crystal display device can be formed by arrangement of a liquid-crystal cell 32 at least on the light emission surface side of the plane light source unit 2 as shown in FIGS. 4 and 5. In this case, when the plane light source unit 2 is used as a front-lighting system as shown in FIG. 4, the light pipe having a light output means in its upper surface can be used preferably from the point of view of improvement of display quality, etc. The arrangement of a reflection layer is essential for a reflection type liquid-crystal display device to achieve display in a reflection mode using external light. As shown in FIG. 4, the reflection type liquid-crystal display device can be constituted by a structure in which a suitable liquid-crystal cell having a reflection layer 4 in the inside or outside of the cell is used so that a liquid-crystal layer is positioned at least between the plane light source unit 2 and the reflection layer 4. The arrangement of the reflection layer in the inside of the cell can be made by a method of using a cell substrate, and so on.

Also in the case where a transmission type liquid-crystal display device is formed as shown in FIG. 5, a reflection layer 6 can be arranged as occasion demands. In this case, the transmission type liquid-crystal display device can be formed as a structure in which the plane light source unit 2 is disposed between the liquid-crystal cell 32 and the reflection layer 6. When the reflection layer 6 is disposed, the liquid-crystal display device can be provided as a reflection-transmission double type liquid-crystal display device. Although FIG. 5 shows the case where the light pipe 1 has a light output means A in its upper surface 1a, the present invention may be applied also to the case where the light pipe 1 has a light output means A in its lower surface 1b. When the light pipe has the light output means in its upper surface as shown in FIG. 5, the optical path in the light pipe in a transmission mode can be made long so that light is spread widely. Hence, the intensity of the emission line can be moderated. This moderation favorably contributes to prevention of moire and improvement of uniformity of display. Hence, the reflection layer can be disposed on the light exit surface of the light pipe through a tacky layer, or the like, so as to adhere integrally to the light pipe.

In the reflection-transmission double type liquid-crystal display device according to the present invention, lowering of light utilizing efficiency generated in a reflection mode is slight as that caused by absorption loss, reflection loss, and soon, due to the light pipe. Hence, brightness approximately equivalent to that of the background-art reflection type liquid-crystal display device can be achieved. Even in a transmission mode, brightness equivalent to that of the background-art transmission type liquid-crystal display device can be achieved. Moreover, reversal of display can be prevented from being generated between reflection and transmission. Moreover, contrast can be prevented from being lowered because of light leaking from the light pipe. Hence, a liquid-crystal display device of good visibility can be obtained.

The reflection layer may be formed of a suitable material according to the background art. Especially, examples of the preferable reflection layer include: a coating layer containing powder of a high-reflectance metal such as aluminum, silver, gold, copper or chromium, or alloy of such high-reflectance metal in a binder resin; a layer of the metal or a dielectric multilayer thin film deposited by a suitable thin-film forming method such as a vacuum vapor deposition method, a sputtering method, or the like; a reflection sheet having the coating or deposited layer supported by a base material made of a film, or the like; a sheet of metal foil; and so on. From the point of view of moire prevention by moderation of the intensity of the emission line, improvement of uniformity of display, etc., it is preferable that the reflection layer is formed so as to make diffuse reflection occur. Because the diffuse reflection causes great reduction in light directivity unfavorably, the intensity of diffusion may be preferably in a range of from 5 to 15 degrees in terms of average diffusion angle but is not limited thereto. The diffuse type reflection layer can be formed by a suitable method in accordance with the background art such as a method of roughening the reflection surface.

The process of sticking the reflection layer closely to the light exit surface of the light pipe to thereby integrate the reflection layer with the light pipe can be performed by a suitable method such as a method of using an adhesive means such as a tacky layer or another adhesive layer, a method of forming the aforementioned coating or deposited layer directly on the light exit surface of the light pipe, etc. In this case, from the point of view of prevention of injury, oxidation, deterioration, etc. of the reflection surface, it is preferable that the outer surface of the reflection layer is coated and protected. From this point of view, the aforementioned reflection sheet or the like may be used preferably. According to the reflection sheet, the aforementioned diffuse type reflection layer can be formed easily through roughening the surface of the film base material, or the like, of the reflection sheet.

The process of roughening the surface of the reflection layer itself or the surface of the support base material of the reflection layer can be performed by a suitable method. Examples of the suitable method include: a mechanical or chemical processing method such as embossing, buffing, transferring a rough-surface shape of a mold, or the like; a method of making suitable inorganic or organic particles contained in the surface; a method of applying a layer containing such inorganic or organic particles; or the like. The inorganic particles are made of silica, alumina, titania, zirconia, tinoxide, indium oxide, cadmium oxide, antimony oxide, etc. and may be electrically conductive. The organic particles are made of a crossedlinked or non-crosslinked polymer, or the like.

In the aforementioned reflection type or reflection-transmission double type liquid-crystal display device, the plane light source unit makes visual recognition in a switched-on mode possible. Hence, when visual recognition is made in a reflection mode, the light source need not be switched on. That is, the light source is provided so as to be able to be switched on/off. Any method can be used for switching on/off the light source. Anyone of the background-art methods may be used.

Generally, as shown in FIGS. 4 and 5, the liquid-crystal display device is formed by suitably assembling a liquid-crystal cell 32 having a transparent electrode (not shown) functioning as a liquid-crystal shutter, a driver attached to the liquid-crystal cell 32, polarizing plates 31 and 33, and a surface light unit 2 serving as a front-lighting or back-lighting system; and by suitably assembling constituent parts such as a reflection layers 4 or 6, a compensatory phase retarder, etc. as occasion demands.

Any suitable material can be formed as the liquid-crystal cell without any particular limitation. On the basis of the format of orientation of liquid crystal, examples of a suitable liquid-crystal cell include: a TN liquid-crystal cell, an STN liquid-crystal cell, a perpendicularly oriented cell, an HAN cell, a twisted or non-twisted cell such as an OCB cell, a guest-host liquid-crystal cell, a ferroelectric liquid-crystal cell, etc. Further, the method for driving liquid crystal is not particularly limited. For example, a suitable drive method such as an active matrix method, a passive matrix method, etc., may be used.

A suitable material can be used as each of the polarizers. A material high in the degree of polarization such as an absorption type linear polarizer of iodine, dye, etc., can be used preferably from the point of view of obtaining display with good-contrast ratio by incidence of high-grade linearly polarized light, etc. Incidentally, the polarizing plate may be provided on each side of the liquid-crystal cell 32 as shown in FIGS. 4 and 5 or may be provided on a single side of the liquid-crystal cell 32.

When the liquid-crystal display device is formed, at least one layer of a suitable optical device such as a diffusing plate, an anti-glare layer or a protective layer provided on the visual side, a compensatory phase retarder provided between the liquid-crystal cell and the polarizer, a diffusing plate 5 disposed on the light pipe 1 as shown in FIGS. 4 and 5, a light condensing or optical path control sheet such as a prism sheet or a lens sheet, or a luminance enhancing plate (polarization separating plate) can be arranged in a suitable position. The compensatory retarder plate is provided to compensate for wavelength dependence of birefringence, or the like, to improve visibility, or the like.

The compensatory phase retarder is disposed between the visual side polarizing plate and the liquid-crystal cell and/or between the back side polarizing plate and the liquid-crystal cell as occasion demands. In the present invention, from the point of view of keeping the light output characteristic of the light pipe as good as possible, it is preferable that the number of optical layers disposed between the liquid-crystal cell and the light pipe is as small as possible. Incidentally, a suitable material in accordance with the wavelength range, etc., can be used as the compensatory phase retarder. The compensatory retarder plate may be formed as a single layer or as a laminate of two or more phase difference layers.

The reflection type liquid-crystal display device shown in FIG. 4 is viewed through light transmitted through the long side surfaces of the light pipe as described above. Incidentally, in a mode in which the light source 21 is switched on, light exiting from the lower surface 1b of the light pipe 1 is transmitted through the liquid-crystal display unit 3 and reflected by the reflection layer 4. Hence, the reflected light goes back to the liquid-crystal display unit 3, so that a display image transmitted through the long side surfaces a2 of the light pipe 1 is viewed. On the other hand, in an external light mode in which the light source 21 is switched off, external light incident on the long side surfaces a2 in the upper surface 1a of the light pipe 1 is transmitted through the liquid-crystal display unit 3 and then reflected by the reflection layer 4. Hence, a display image can be viewed in the same manner as described above.

On the other hand, the transmission type or reflection-transmission double type liquid-crystal display device shown in FIG. 5 is viewed as follows. In a transmission mode in which the light source 21 is switched on, light exiting from the lower surface 1b of the light pipe 1 is reflected by the reflection layer 6 and then transmitted through the long side surfaces a2, etc., of the light pipe 1. Hence, a display image is viewed via the liquid-crystal display unit 3. In a reflection mode in which the light source 21 is switched off, external light is transmitted through the long side surfaces a2 in the upper surface 1a of the light pipe 1 via the liquid-crystal display unit 3. Then, the light is reflected by the reflection layer 6 and transmitted through the long side surfaces a2, etc., of the light pipe 1 in the same manner as that in the transmission mode. Hence, a display image can be viewed via the liquid-crystal display unit 3.

In the present invention, optical devices or parts such as a light pipe, a liquid-crystal cell, a polarizing plate, etc. for forming the liquid-crystal display device may be wholly or partially integrally laminated/fixed onto one another, or maybe disposed separably. From the point of view of prevention of lowering of contrast based on suppression of interface reflection, etc., it is preferable that such optical devices or parts are fixed onto one another. A suitable transparent adhesive agent such as a tackifier, etc., can be used for the close fixing process. A layer of the transparent adhesive agent may be made to contain the aforementioned fine particles, or the like, so that the layer is provided as an adhesive layer exhibiting a diffusing function.

EXAMPLE 1

A polymethacrylate plate was processed into a predetermined shape in advance. A surface of the polymethacrylate plate was cut by a diamond tool to thereby obtain a light pipe having a light output means in its upper surface. The light pipe was 40 mm wide and 25 mm deep, and had an incidence side surface 1 mm thick and a counter side surface 0.6 mm thick. The light pipe had upper and lower surfaces formed as flat surfaces. Prismatic structures were formed in the upper surface at intervals of a pitch of 210 $\mu$m. The prismatic structures had ridgelines inclined up rightward at an inclination angle of 23 degrees with respect to the incidence side surface. Each of the prismatic structures had a combination of a short side surface and a long side surface. The inclination angles of the short side surfaces were in a range of from 42.5 to 43 degrees. The inclination angles of the long side surfaces were in a range of from 1.8 to 3.5 degrees. The inclination angle difference between adjacent ones of the long side surfaces was not larger than 0.1 degrees. The projected width of each of the short side surfaces on the lower surface was in a range of from 10 to 16 $\mu$m. The ratio of the protected area of the long side surfaces on the lower surface to the protected area of the short side surfaces on the lower surface was not smaller than 12. Incidentally, the formation of the light output means was started from a position distanced by 2 mm from the incidence side surface.

The radius of curvature of a corner portion formed at a point of intersection between the incident side surface of the light pipe and each side surface adjacent to the incident side surface was not larger than 0.1 mm (This applies also hereinafter). A cold-cathode tube (made by Harison Electric Co., Ltd.) having a diameter of 2 mm was disposed on the incidence side surface of the light pipe. The edges of a light source holder made of a white lamp reflection sheet were brought into close contact with the upper and lower end surfaces of the light pipe while the light source holder encloses the cold-cathode tube. An inverter and a DC power supply were connected to the cold-cathode tube. A normally white reflection type liquid-crystal cell was disposed on the lower surface side of the light pipe. Thus, a liquid-crystal display device was obtained.

EXAMPLE 2

A plane light source unit and a liquid-crystal display device were obtained in the same manner as that in Example 1 except that the light pipe was replaced by a light pipe in which the intersection points of corner portions were polished by No. 2000 sandpaper and then mirror-polished by a compound to thereby set the radius of curvature to be about 0.25 mm.

Comparative Example 1

A plane light source unit and a liquid-crystal display device were obtained in the same manner as that in Example 1 except that the light pipe was replaced by a light pipe in which the intersection points of corner portions were polished by No. 2000 sandpaper and then mirror-polished by a compound to thereby set the radius of curvature to be about 0.4 mm.

Comparative Example 2

A plane light source unit and a liquid-crystal display device were obtained in the same manner as that in Example 1 except that the light pipe was replaced by a light pipe in which the intersection points of corner portions were polished by No. 2000 sandpaper and then mirror-polished by a compound to thereby set the radius of curvature to be about 0.6 mm.

Evaluation Test

The liquid-crystal display device obtained in each of Examples and Comparative Examples was examined on the presence/absence of shade in the condition that the light source was switched on while the liquid-crystal cell was supplied with no voltage. If some shade was produced, the width of the shade was measured. Results of the measurement were shown in the following Table.

|  | Example 1 | Example 2 | Comparative Example 1 | Comparative Example 2 |
| --- | --- | --- | --- | --- |
| Shade Width (mm) | 0 | 0 | 0.5 | 0.9 |

In the above description, the production of shade was not observed in Example 1. In Example 2, although a very thin dark line was observed in the left corner portions, this dark line was on a level without causing any practical problem so that the width of the line could not be measured. On the other hand, in Comparative Example 1, a clear shade line was observed in a range of from the left end to the center portion, so that the illumination light obtained was ununiform and unnatural. In Comparative Example 2, a worse state was obtained. It is proved from the above description that a plane light source unit and a liquid-crystal display device uniform in brightness and easy to view are obtained according to the present invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:

rectangular upper and lower surfaces;

an incidence side surface which is one of side surfaces between said upper and lower surfaces; and light output means formed in one of said upper and lower surfaces so that light incident on said incidence side surface exits from the other one of said upper and lower surfaces through said light output means, wherein a radius of curvature of a corner portion formed at a point of intersection between said incidence side surface and each of side surfaces adjacent to said incidence side surface is not larger than 0.3 mm.

2. A light pipe according to claim 1, wherein said light output means includes slopes facing said incidence side surface while inclined at an angle in a range of from 35 to 45 degrees with respect to a reference plane of said other one of said upper and lower surfaces where said light output means is not formed.

3. A light pipe according to claim 2, wherein said light output means is constituted by a repetitive structure of continuous or discontinuous prismatic structures disposed at intervals of a pitch of from 50 $\mu$m to 1.5 mm and each of prismatic structures having a combination of a short side surface and a long side surface, each of said short side surfaces is made of a slope inclined down from the incidence side surface side to a counter side surface opposite to the incidence side surface at an inclination angle in a range of from 35 to 45 degrees with respect to a reference plane which is the other one of said upper and lower surfaces where said light output means is not formed, and each of said long side surfaces is made of a slope inclined at an inclination angle in a range of from 0 (exclusively) to 10 degrees with respect to said reference plane so that an angle difference between said long side surfaces as a whole of said light output means is not larger than 5 degrees, so that an inclination angle difference between adjacent ones of said long side surfaces is not larger than 1 degree and so that a projected area of said long side surfaces on said reference plane is not smaller than 8 times as large as a projected area of said short side surfaces on said reference plane.

4. A light pipe according to claim 2, wherein each of said slopes or short side surfaces of said light output means facing said incidence side surface has a width of not larger than 40 $\mu$m in terms of the projected width of said short side surface on said reference plane.

5. The light pipe according to claim 4, wherein the width is from 3 to 20 $\mu$m.

6. The light pipe according to claim 5, wherein the width is from 5 to 15 $\mu$m.

7. A light pipe according to claim 1, wherein said light output means has ridgelines each of which makes an angle of not larger than ±30 degrees with respect to a reference plane of said incidence side surface.

8. A plane light source unit comprising:

a light pipe according to claim 1; and a linear light source disposed on said incidence side surface of said light pipe.

9. A plane light source unit according to claim 8, wherein said light pipe includes the light output means in an upper surface of said light pipe so that said plane light source unit is used as a front-lighting system.

10. A liquid-crystal display device comprising:

a plane light source unit according to claim 8; and a liquid-crystal cell.

11. A liquid-crystal display device according to claim 10, wherein said plane light source unit is used as a front-lighting system, and said liquid-crystal cell includes a reflection layer so that said liquid-crystal display device is used as a reflection type liquid-crystal display device.

12. The light pipe according to claim 1, wherein the radius of curvature of the corner portion is not larger than 0.2 mm.

13. The light pipe according to claim 12, wherein the radius of curvature of the corner portion is not larger than 0.1 mm.

14. The light pipe according to claim 1, wherein the light output means includes two rounded corner portions, each of said rounded corner portions having a radius of curvature not larger than 0.3 mm.

15. The light pipe according to claim 14, wherein the two rounded corner portions are disposed adjacent to said incidence side surface.

16. The light pipe according to claim 15, wherein there is only a single incidence side surface.

17. The light pipe of claim 14, wherein each of said rounded corner portions have a radius of curvature lower than 0.25 mm.

18. The light pipe of claim 1, wherein said radius of curvature is lower than 0.25 mm.

* * * * *